(12) United States Patent
Doser et al.

(10) Patent No.: US 8,483,540 B2
(45) Date of Patent: Jul. 9, 2013

(54) METHOD AND SYSTEM FOR SUBFRAME ACCURATE SYNCHRONIZATION

(75) Inventors: Ingo Doser, Burbank, CA (US); Ana Belen Benitez, Los Angeles, CA (US); Dong-Qing Zhang, Burbank, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1016 days.

(21) Appl. No.: 12/312,362

(22) PCT Filed: Dec. 12, 2006

(86) PCT No.: PCT/US2006/047337
§ 371 (c)(1),
(2), (4) Date: May 6, 2009

(87) PCT Pub. No.: WO2008/073083
PCT Pub. Date: Jun. 19, 2008

(65) Prior Publication Data
US 2010/0054696 A1    Mar. 4, 2010

(51) Int. Cl.
*H04N 5/932* (2006.01)
*H04N 5/935* (2006.01)

(52) U.S. Cl.
USPC ...... 386/201; 382/181; 704/231; 386/E5.003; 704/E15.001

(58) Field of Classification Search
USPC ............. 386/201, 181; 704/231; 823/181
See application file for complete search history.

(56) References Cited

U.S. PATENT DOCUMENTS

| 5,877,842 A | * | 3/1999 | Gibbens et al. | 352/12 |
| 2004/0183825 A1 | * | 9/2004 | Stauder et al. | 345/723 |

FOREIGN PATENT DOCUMENTS

| EP | 1460835 | 9/2004 |
| EP | 1465193 | 10/2004 |
| GB | 2243969 | 3/1991 |
| GB | 2326781 | 12/1998 |
| GB | 2366110 | 2/2002 |
| WO | WO 97/37489 | 10/1997 |
| WO | WO 2005/004470 | 1/2005 |
| WO | WO2005004470 | * 1/2005 |

OTHER PUBLICATIONS

Search report dated Apr. 3, 2007.

* cited by examiner

*Primary Examiner* — Thai Tran
*Assistant Examiner* — Girumsew Wendmagegn
(74) *Attorney, Agent, or Firm* — Robert D. Shedd; Jorge Tony Villabon

(57) ABSTRACT

A method, apparatus and system for synchronizing between two recording modes includes identifying a common event in the two recording modes. The event in time is recognized for a higher accuracy mode of the two modes. The event is predicted in a lower accuracy mode of the two modes by determining a time when the event occurred between frames in the lower accuracy mode. The event in the higher accuracy mode is synchronized to the lower accuracy mode to provide subframe accuracy alignment between the two modes. In one embodiment of the invention, the common event includes the closing of a clap slate, and the two modes include audio and video recording modes.

15 Claims, 5 Drawing Sheets

METHOD AND SYSTEM FOR SUBFRAME ACCURATE SYNCHRONIZATION

This application claims the benefit, under 35 U.S.C. §365 of International Application PCT/US2006/047337, filed Dec. 12, 2006 which was published in accordance with PCT Article 21(2) on Jun. 19, 2008 in English.

TECHNICAL FIELD

The present invention generally relates to synchronization of recording modes such as audio and image recording components, and more particularly to, for example, synchronizing clap slates in the movie and television industries with sub-frame accuracy.

BACKGROUND

In movie production, image (picture) and audio are recorded by different devices. When combining image and audio later in the process, the two types of information have to be synchronized. Usually, this is performed manually, by an operator assigning time codes to an audible "clap" for a slate with the visible closing of the slate. However, due to the nature of movie capture, this can be done only with a limited accuracy since the image or film is recorded at frame rates usually between 24 and 60 frames per second. Hence, the problem of $1/24$ seconds or $1/60$ seconds uncertainty between the visual clap and the audio may occur.

Although there have been a number of prior systems that are able to synchronize audio and image streams in a manual or automatic manner using slates, these techniques generally face the problem of subframe misalignment due to the sampling rate (frame rate) of the audio stream. The sampling rate of the audio stream is often much larger than that of the image stream, and the correct alignment point is almost always in-between two consecutive image frames.

SUMMARY

A method, apparatus and system in accordance with various embodiments of the present invention address these and other deficiencies of the prior art by providing synchronization at a sub-frame accuracy between at least two recording modes.

In one embodiment of the present invention, a method for synchronizing two recording modes includes identifying a common event in the two recording modes, determining an occurrence of the common event in time for at least a higher accuracy one of the two recording modes, predicting an occurrence of the common event in a lower accuracy one of the two recording modes by determining a time when the common event occurred between frames in the lower accuracy one, and synchronizing the occurrence of the common event in the higher accuracy one to the lower accuracy one to provide sub-frame accuracy alignment between the two recording modes.

In an alternate embodiment of the present invention, a method for synchronizing an audio recording and a video recording includes identifying a common event in the audio recording and the video recording, determining the location of the common event in the audio recording, associating the location of the event in the audio recording with a nearest frame of the occurrence of the event in the video recording, and if the event does not occur during a frame in the video recording, estimating a location between frames for the occurrence of the event, and adjusting the associated location of the audio recording by an amount equal to a difference between the occurrence of the nearest frame and the estimated location for the occurrence of the event.

In the above described embodiments of the present invention, the common event can include the closing of a clap slate and estimating the location between frames for the occurrence of the common event comprises calculating an angular speed of the closing of the clap slate and predicting a time when the clap slate has closed.

In an alternate embodiment of the present invention, a system for synchronizing video and audio information in a video production, the audio and video information having an event in common, includes a means for determining a nearest frame of the occurrence of the common event in a video mode of the video production, a means for determining the location of the common event in an audio mode of the video production and associating the location of the common event in the audio mode with the nearest frame of the occurrence of the common event in the video mode, a means for estimating the occurrence of the common event in the video mode by determining a location between frames when the common event occurred in the video mode, and a means for synchronizing the audio mode to the video mode. In one embodiment of the present invention, the synchronizing means synchronizes the audio mode to the video mode by adjusting the associated location of the audio mode by an amount equal to a difference between the occurrence of the nearest frame and the estimated location for the occurrence of the event in the video mode. In an alternate embodiment of the present invention, the synchronizing means synchronizes the audio mode to the video mode by adding a correction time to time of occurrence of the common event in the audio mode to designate a starting point and aligning the starting point to a nearest frame after the occurrence of the common event in the video mode.

BRIEF DESCRIPTION OF THE DRAWINGS

The teachings of the present invention can be readily understood by considering the following detailed description in conjunction with the accompanying drawings, in which.

Figure 1:
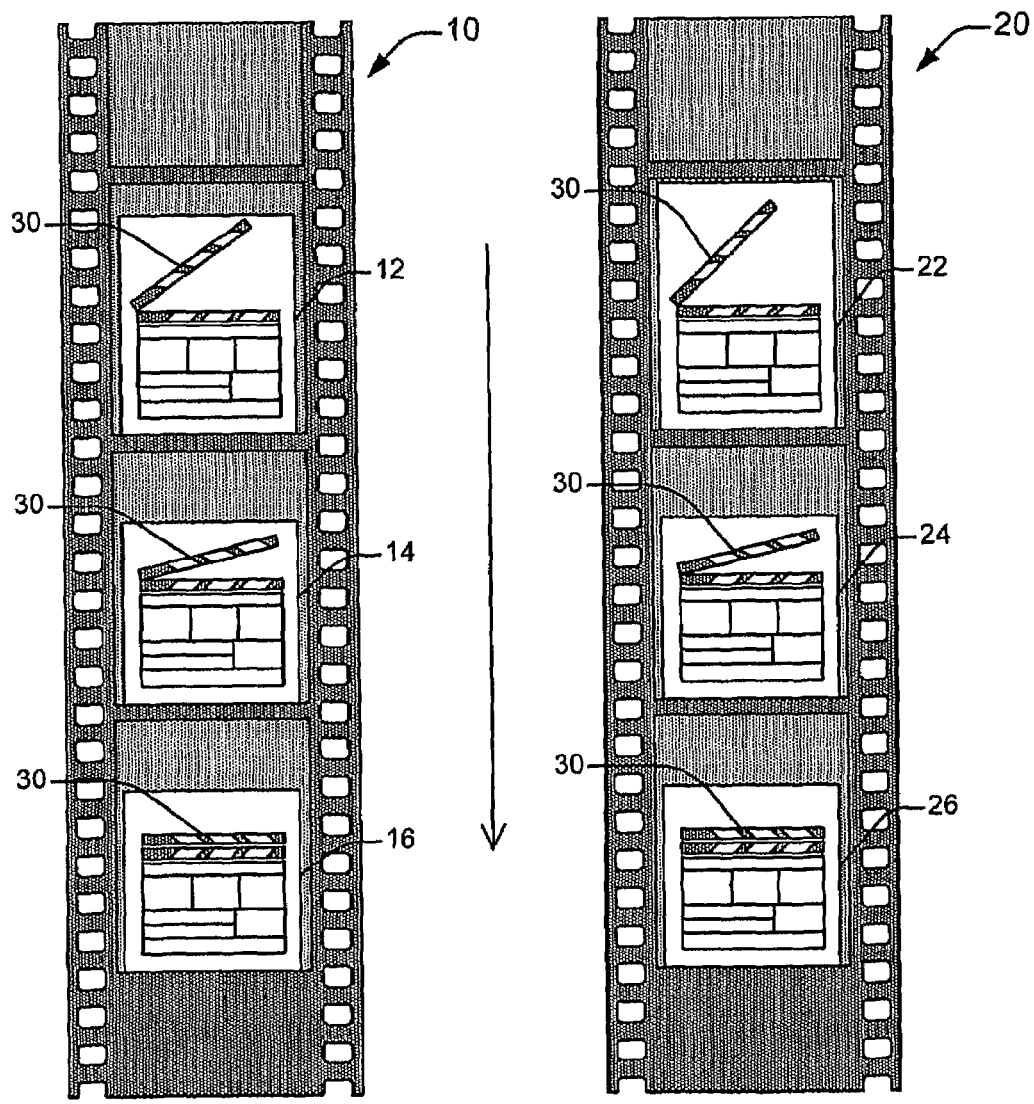
FIG. 1 depicts two film sequences illustrating clap slates in a plurality of states.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for audio and image synchronization in, for example, movie production applications. Although the present invention will be described primarily within the context of movie production, the specific embodiments of the present invention should not be treated as limiting the scope of the invention. It will be appreciated by those skilled in the art and informed by the teachings of the present invention that the concepts of the present invention can be advantageously applied in other synchronization techniques. For example, the concepts of the present invention can be implemented in film splicing, film recording, audio mixing, image mixing and the like. Such concepts may include an indicator that provides an event in at least two modes (e.g., audio and visual modes). The indicator is then recognized in time for at least a higher accuracy mode. Then, the lower accuracy mode has a corresponding time extrapolated to predict the time when the event occurred between frames of the lower accuracy mode. The events in the two modes are then synchronized to provide sub-frame accuracy between the two modes.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor", "module" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In accordance with various embodiments of the present invention, a method, apparatus and system for synchronizing audio and image components in film production are disclosed. In one embodiment, the present invention describes a solution for achieving a more accurate synchronization of audio and video. When synchronizing audio and video, a slate time code is provided with the modality of higher accuracy (currently, audio), which is then aligned with a slate time code of the other modality (currently, video).

Referring to FIG. 1, two example slate closing sequences 10 and 20 are illustratively depicted. In sequence 10, a first picture 12 shows a slate 15 at a 30 degree open position, a second picture 14 shows a slate 30 in a 15 degree open position, and a third picture 16 shows a closed slate 30. In this case, an audio clap occurs just at the exact time the third picture 16 is captured, if a constant angular speed of the clap slate (also referred to herein as a clapper) is assumed. Note that although the slate 30 can be in any position or orientation, the angular speed of the slate in the projected 2D image by the camera remains constant because of the linear perspective projection relationship.

In the sequence 20, a first picture 22 shows a slate 30 in a 50 degree open position, a second picture 24 shows a slate 30 with a 15 degree open position, and a third picture shows a closed slate 30. In this case, the audio clap does not occur at the time of the third picture's capture. Assuming constant angular speed of the clapper, it is clear that the clap must have occurred some time between the shot of picture two 24 and the shot of picture three 26.

Figure 2:
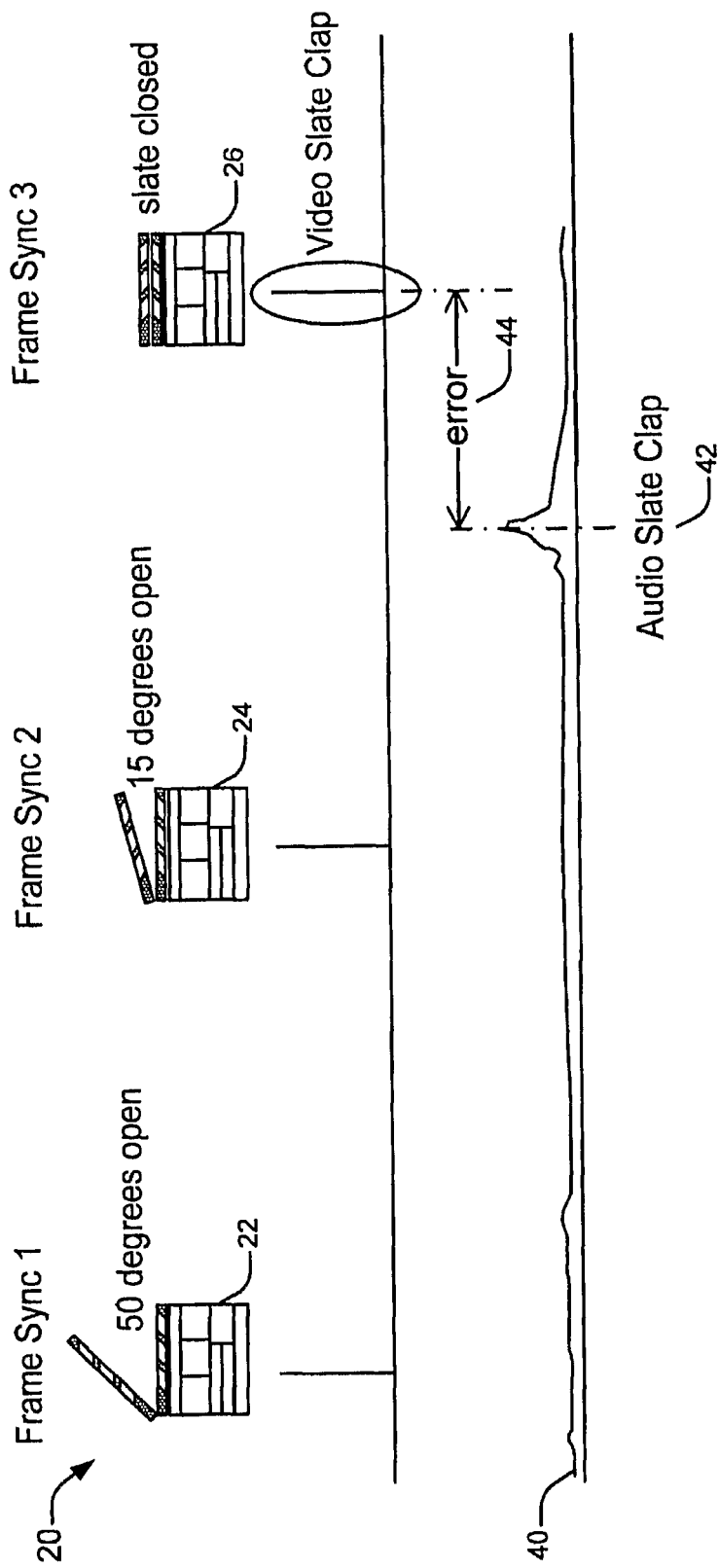
FIG. 2 depicts a time line illustrating a mismatch or error between an audio clap and a visual clap in a conventional technique.

Referring to FIG. 2, a time line of events shows sequence 20 along with an audio track 40 to demonstrate a time of occurrence 42 of the audio clap. Currently, manual or automatic synchronization methods of audio with images align a time code of the first visual frame that shows the closed slate with the audio time code of the audible clap disregarding the inaccuracy resulting from this technique. More specifically, using the described technique, the slate closed state 26 is aligned with the audio clap slate event 42. This would result in an error 44 between the audio and the image for the scene or sequence using this conventional technique.

In accordance with the present invention, a solution for achieving a more accurate synchronization of audio and video is defined. In synchronizing audio and video, a slate time code for audio is corrected to align with a slate time code of video. That is, in various embodiments of the present invention the slate time code of the video is determined based on visual clues provided in the video sequence. Video as referred to herein relates to images, moving images and/or visual data.

Figure 3:
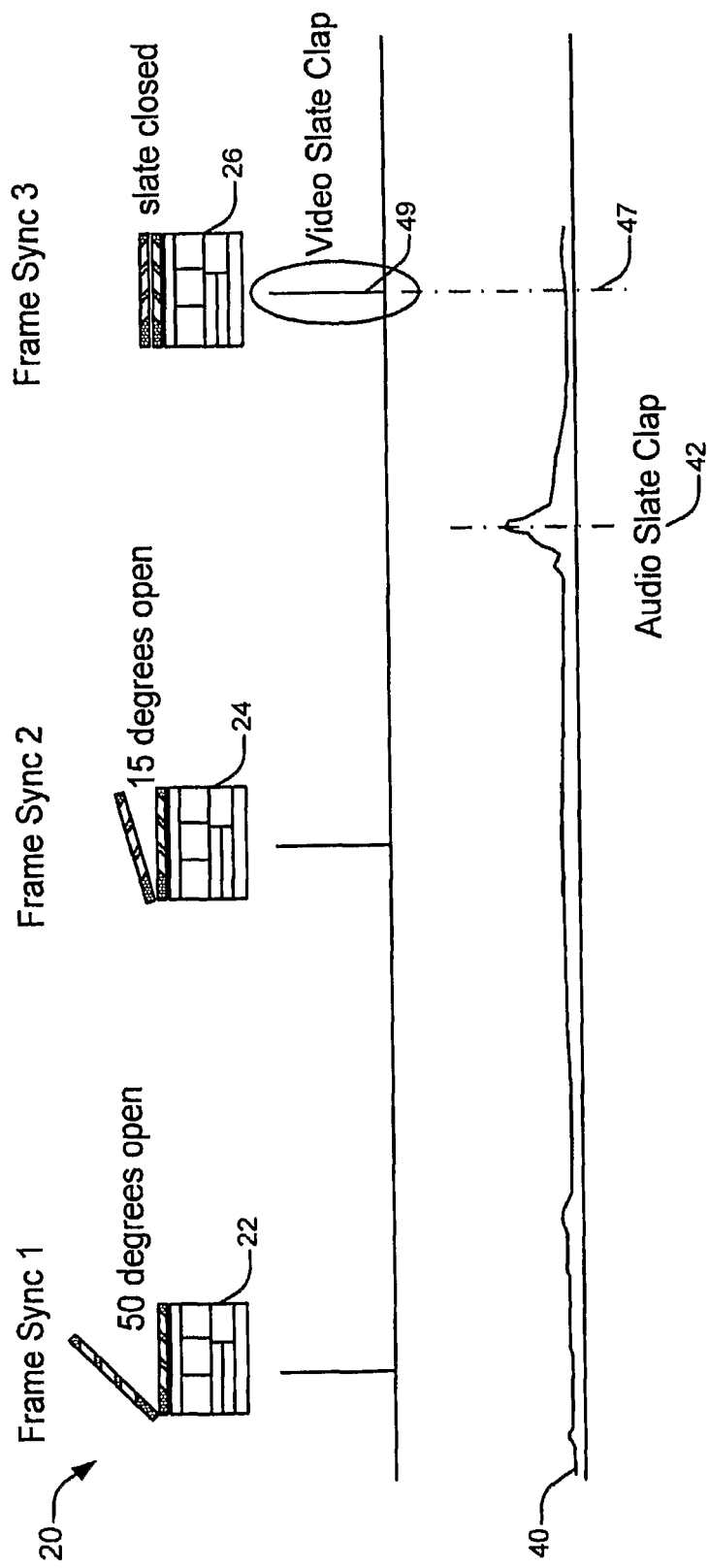
FIG. 3 depicts a time line illustrating synchronization between a new start point offset from an audio clap and a visual clap in accordance with an embodiment of the present invention.

Referring to FIG. 3, the audio slate time code is corrected to appropriately align with the video time code of the closed slate. If the clapper closed in between two motion picture frames, then the audio time code is aligned not with the first visual frame where the slate is closed but with the actual time when the clap occurred. In FIG. 3, the exact moment in time does not have a picture time code associated with it because it happened between two picture frames. Therefore and in accordance with the present invention, the audio slate time code is corrected by determining a new start point 47 which is aligned with the time code (event time) of the first picture frame 49 that shows the closed slate.

Figure 4:
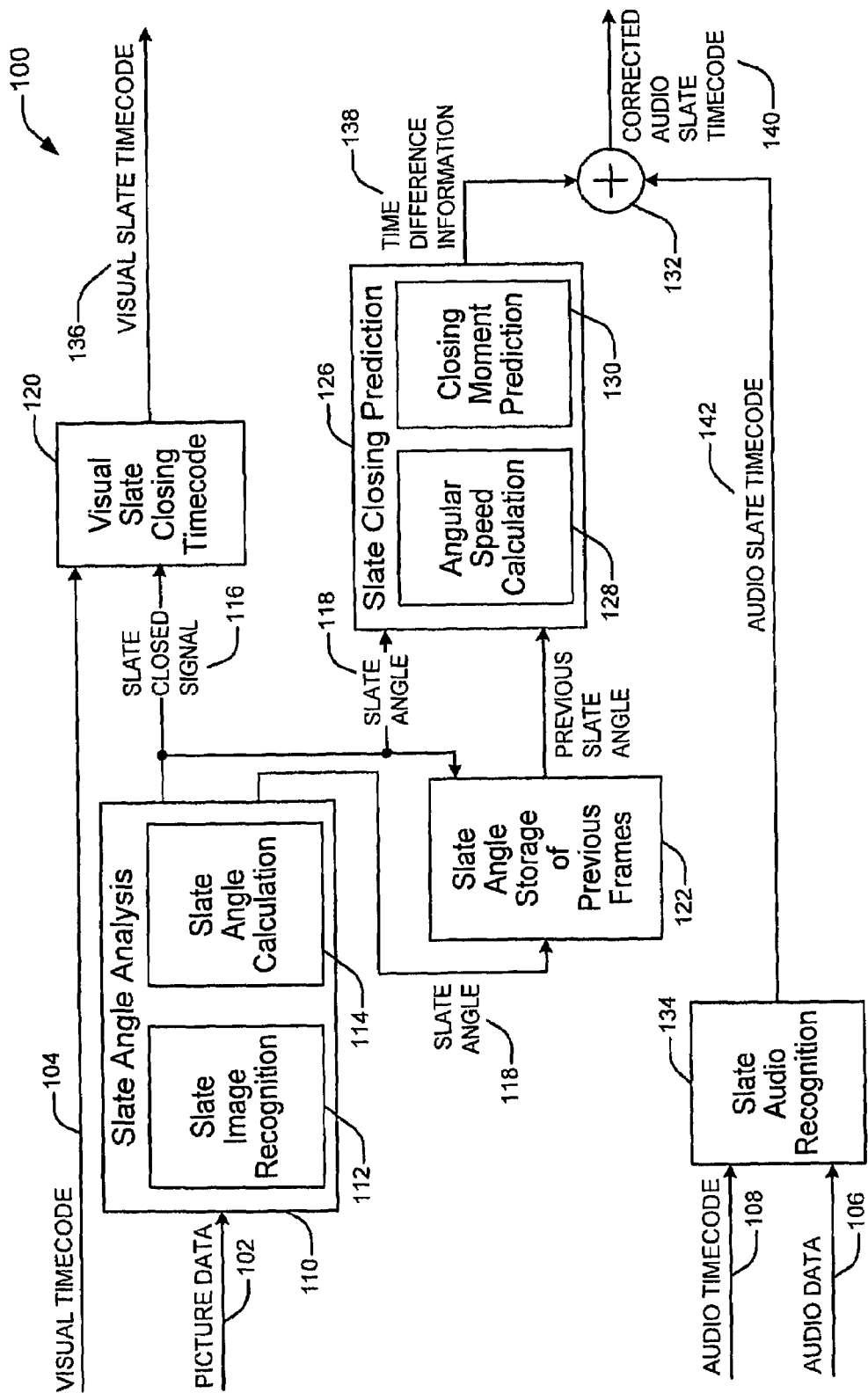
FIG. 4 depicts a high level block diagram of a system for synchronizing two recording modes in accordance with an embodiment of the present invention.

FIG. 4 depicts a high level block diagram of a system for synchronizing two recording modes in accordance with an embodiment of the present invention. The system 100 of FIG. 4 illustratively comprises a stand-alone device that synchronizes two modes used in recording. However, in an alternate embodiment, the system 100 can comprise a part of a mixing device, a recording device, a production device or any other device that needs to synchronize two modes of recordings. In one embodiment of the present invention, the modes include audio and visual data.

In the system 100 of FIG. 4, the system 100 illustratively comprises a slate angle analysis block 110, a slate closing prediction block 126, a visual slate closing timecode block 120, a slate audio recognition block 134 and a slate angle storage block 122. In the system 100 of FIG. 4, the slate angle analysis block illustratively comprises a slate image recognition block 112 and a slate angel calculation block 114. In addition, in the system 100 of FIG. 4, the slate closing prediction block illustratively comprises an angular speed calculation block 128 and a closing moment prediction block 130. In the system 100 of FIG. 1, motion picture data 102 is communicated to the slate angle analysis block 110. In addition, motion picture time codes (visual timecode) 104 are communicated to the visual slate closing timecode block 120. Concurrently, audio data 106 with audio time codes 108 are communicated to the slate audio recognition block 134. The motion picture data 102 is received by the slate image recognition mechanism 112 of the slate angle analysis block 110. The slate image recognition mechanism 112 analyzes the picture content 102 and determines a geometric shape that resembles a slate image. The image recognition mechanism 112 can be implemented in software or hardware, or can alternatively be performed manually by a technician. The recognition process can include identifying portions of the clap slate either automatically (using image recognition software) or manually.

In the slate angle analysis block 110, the geometrical shape resembling the slate determined by the recognition mechanism 112 is further analyzed by a slate angle calculation block 114 to detect the angle of the clapper. The slate angle analysis block 110 can include video recognition software (not shown) configured to identify the clapper and to determine slate angles suring different frames. In one embodiment of the present invention, the angle determination can be performed visually, for example, by applying a protractor on an image of the clapper. As such, a determination of a more precise instant (time) of when the clapper was closed can be made. In many cases, the identification of the clapper in an image or video sequence is easily accomplished because the clapper has distinctive markings and is usually prominently displayed in the video sequence.

The slate analysis block 110 of FIG. 4 illustratively comprises two output signals. One output signal 116 can comprise a "slate closed signal". The slate closed signal 116 is used to identify a first picture frame having the clapper completely closed. For example, in one embodiment of the present invention, the slate closed signal 116 can be implemented as a boolean signal becoming "true" for the time periods for all picture frames with the slate closed and "false" for all other frame periods. A second output signal 118 of the slate analysis block 110 can comprise a "current slate angle" signal. The current slate angle signal 118 identifies the angle of the clapper for a current picture in, for example, degrees or radians. The second output signal 118 is communicated to two-subsequent blocks in parallel: the slate closing prediction block 126 and the slate angle storage block 122.

The output signal 116 (slate closed signal) is received by the visual slate closing timecode block 120. At the visual slate closing timecode block 120, a first time code during which the slate closed signal 116 becomes "true" is selected as a visual slate time code 136 which is then used for synchronization with audio. The slate angle storage of previous frames block 122 stores one or several previous clap slate angles to permit the state closing prediction 126 to make predictions on speed and position of the slate. In this way, angular speed can be calculated in the angular speed calculation block 128 of the slate closing prediction block 126 and a closing moment prediction can be made in the closing moment prediction block 130 of the slate closing prediction block 126. Depending on the accuracy desired, angular velocity and angular acceleration can be considered in predicting the close time of the clapper. In one embodiment, a constant angular velocity is assumed. In one embodiment of the present invention, the information stored regarding the slate angle of previous frames can be discarded from the slate angle storage block 122 after the slate closing is determined. In one embodiment of the present invention, the slate closed signal 116 from the slate angle analysis block can be used for indicating when the storage information can be discarded, provided that the signal 116 is delayed by at least one picture frame period before being received by the slate angle storage block 122.

In one embodiment of the present invention, the angular speed calculation block 128 uses the clap slate angle of a previous frame (N−1) and a clap slate angle of a frame before the previous frame (N−2) to determine an angular speed of the clap slate. As such, a constant angular speed is assumed. In one embodiment of the present invention, the angular speed calculation block 128 can determine angular speed according to Equation one (1), which follows:

$$\text{AngularSpeed} = [\text{Angle}_{(N-2)} - \text{Angle}_{(N-1)}]/\text{FramePeriod} \qquad (1)$$

AngularSpeed depicts the angular speed of the clap slate or clapper in degrees per second; $\text{Angle}_{(N-1)}$ depicts the angle in degrees of the clapper in the last frame before the clapper closes, $\text{Angle}_{(N-2)}$ depicts the angle in, for example, degrees of the clapper in the second to last frame before the clapper closes and FramePeriod depicts the period of time in seconds between two consecutive video frames (e.g., in the case of motion picture with 24 frames per second, it is 1/24 seconds).

Then, as the slate closed signal 116 becomes "true", the angular speed calculation block 128 can use the absolute value of the last angle ($\text{Angle}_{(N-1)}$) and the calculated AngularSpeed to calculate the expected time of the actual closing of the clapper using Equation two (2), which follows:

$$\text{CloseTime} = \text{Angle}_{(N-1)}/\text{AngularSpeed} \qquad (2)$$

The CloseTime is the time between the last clapper open picture frame and the time when the clapper actually closed. One "CloseTime" has to be subtracted from a FramePeriod (e.g., 1/24 sec) to obtain a "CorrectionTime" (time difference information) 138. This value is a positive value by definition because the clapper is closed before or at the time of the first picture frame with the closed clapper and can be characterized according to Equation three (3), which follows:

$$\text{Correction Time} = \text{FramePeriod} - \text{CloseTime} \qquad (3)$$

A Corrected Audio Slate Time Code 140 is calculated by summing, using for example an adder 132 or similar offset device, the "CorrectionTime" 138 determined, for example, using Equation (3) to the Audio Slate Time Code 142 from the slate audio recognition block 134. The corrected audio slate timecode 140 synchronizes the audio track to the video track to provide the desired synchronization with sub-frame accuracy. The corrected audio slate time code can be characterized according to Equation four (4), which follows:

$$\text{CorrectedAudioSlateTimeCode} = \text{AudioSlateTimeCode} + \text{CorrectionTime} \qquad (4)$$

Using equation (4), the audio and video are actually synced to the frame time code that is closest to the clap slate. The clap slate is recognized in the audio data by the audio recognition device 134. That is, the audio recognition device 134 can designate an audio slate time code 142 or instant that the clap slate occurred. This can be performed, for example in one embodiment, by employing an acoustic waveform analysis and selecting the largest (loudest) peak. Since in this case, the audio signal is more accurate (not restricted to the frame rate of the picture images), the audio event is employed as the reference. This reference is compared with the actual clap slate close in the video signal.

Figure 5:
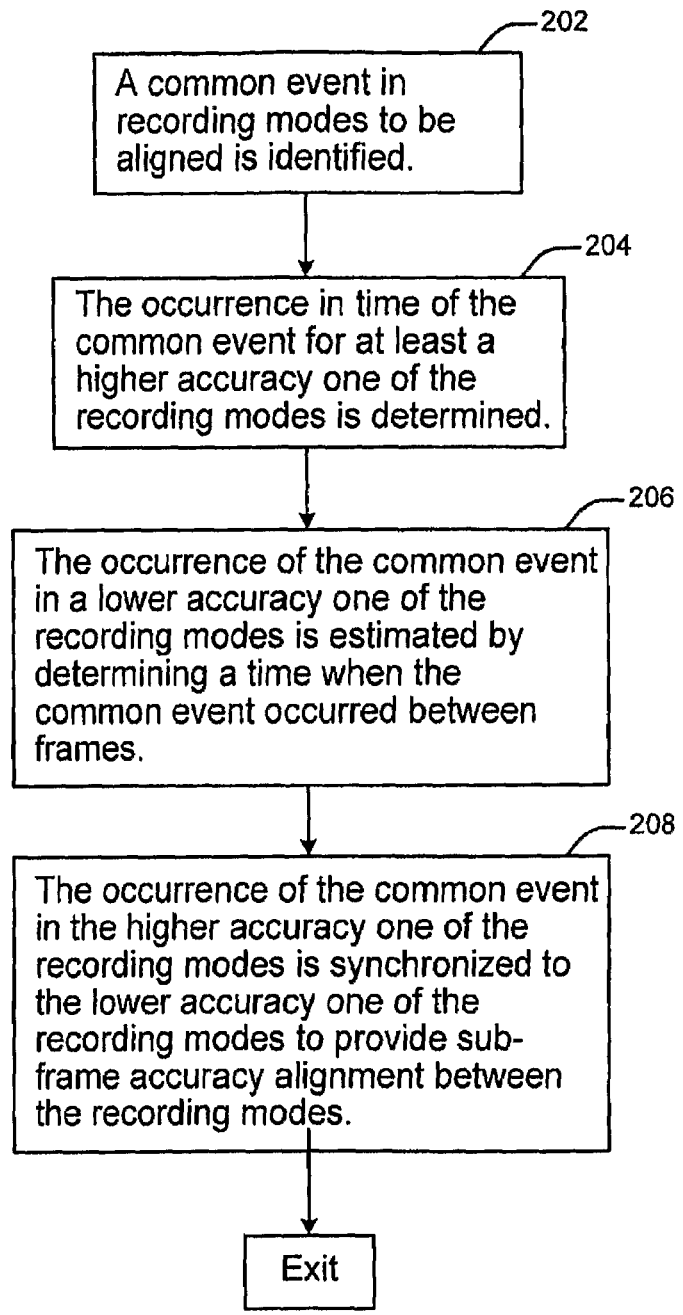
FIG. 5 depicts a flow diagram of a method for synchronizing two recording modes in accordance with an embodiment of the present invention.

FIG. 5 depicts a flow diagram of a method for synchronizing two recording modes in accordance with an embodiment of the present invention. The method of FIG. 5 begins at step 202, in which a common event is identified in at least two recording modes. In one embodiment of the present invention, the two recording modes include an audio recording mode and a video recording mode. The identified common event can include the closing of a clapper which provides a visual and an audio event. The method then proceeds to step 204.

At step 204, the identified event (e.g., the clapper visual and audio) is recognized in time in at least the higher accuracy one of the two recording modes. For example, in one embodiment of the present invention, the higher accuracy recording mode includes the audio recording mode and the lower accuracy mode includes the video recording mode. That is, due to the frame rate restrictions imposed on film recording (e.g., 1/24 sec or 1/60 sec frame rate), the video recording mode is less accurate for identifying an event in time in the video. In the described embodiment, recognizing the event in time for at least a higher accuracy one of the two recording modes includes determining when the clap slate is closed using audio recognition (e.g., acoustic waveform analysis). The method then proceeds to step 206.

At step 206, the event is identified in the lower accuracy recording mode, in the embodiment described above, by determining a time when the event occurred between frames of the video recording mode. This can include calculating an angular speed of the slate closing and predicting a time when the clap slate has closed. The event identification can include performing image recognition or audio recognition. The method then proceeds to step 208.

At step 208, the event in the higher accuracy recording mode and the lower accuracy recording mode are synchronized. For example, in the embodiment described above, to provide sub-frame accuracy alignment between the two modes, the audio event is synchronized to a nearest frame in the video recording. Then a correction time is determined as described above. The determined correction time is then added or subtracted from the time of occurrence of the selected nearest frame to identify a point in time of the occurrence of the event in the video recording. In an alternate embodiment of the present invention, the modes are synchronized by adding a correction time to time of occurrence of the common event in the high accuracy mode (e.g., the audio recording) to designate a starting point and aligning the starting point to a nearest frame after the occurrence of the common event in the lower accuracy mode (e.g., the video recording). The method is then exited.

Having described preferred embodiments for a method, apparatus and system for subframe accurate clap slate synchronization (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for synchronizing an audio recording and a video recording, comprising:
   identifying a closing of a clap slate in the audio recording and the video recording;
   determining the location of the closing of the clap slate in the audio recording;
   associating the location of the closing of the clap slate in the audio recording with a nearest frame of the occurrence of the closing of the clap slate in the video recording;
   if the closing of the clap slate does not occur during a frame in the video recording, using frames depicting the various positions of the clap slate for calculating an angular speed of the closing of the clap slate for estimating a location between frames for the occurrence of the closing of the clap slate; and
   adjusting the associated location of the audio recording by an amount equal to a difference between the occurrence of the nearest frame and the estimated location for the occurrence of the closing of the clap slate.

2. The method of claim 1, wherein the location of the closing of the clap slate in the audio recording is determined using audio recognition.

3. The method of claim 1, wherein a nearest frame for the occurrence of the closing of the clap slate in the video recording is determined using image recognition.

4. The method of claim 1, wherein location of the closing of the clap slate in the audio recording is determined in time.

5. A method for synchronizing visual and audio information in a video production, comprising:
   identifying a closing of a clap slate in an audio mode and in image frames of a visual mode of said video production;
   determining the closing of a clap slate in time for the audio mode;
   predicting the occurrence of the closing of a clap slate in the visual mode by determining a time when the closing of a clap slate occurred between frames of the visual mode;
   determining a time offset between the occurrence of the closing of a clap slate and a first frame after the occurrence of the closing of a clap slate in the visual mode; and
   synchronizing the audio mode to the visual mode by offsetting an audio start time by the determined time offset to provide sub-frame accuracy alignment between the audio and visual modes.

6. The method of claim 5, wherein determining a time offset between the occurrence of the closing of a clap slate and a first frame after the occurrence of the closing of a clap slate comprises calculating an angular speed of the closing of the clap slate and predicting a time when the clap slate has closed.

7. A system for synchronizing video and audio information in a video production, the audio and video information having an event in common comprising:
   a means for determining a nearest frame of the occurrence of a closing of a clap slate in a video mode of said video production;
   a means for determining the location of the closing of the clap slate in an audio mode of said video production and associating the location of the closing of the clap slate in the audio mode with the nearest frame of the occurrence of the closing of the clap slate in the video mode;
   a means for using frames depicting the various positions of the clap slate for calculating an angular speed of the closing of the clap slate for estimating the occurrence of the closing of the clap slate in the video mode by determining a location between frames when the closing of the clap slate occurred in the video mode; and
   a means for synchronizing the audio mode to the video mode.

8. The system of claim 7, further comprising a storage means for storing angular positions of the clap slate for frames of the video mode.

9. The system of claim 7, wherein the means for determining a nearest frame of the occurrence of the closing of a clap slate in a video mode comprises an image recognition means.

10. The system of claim 7, wherein the means for determining a nearest frame of the occurrence of the closing of a clap slate in a video mode comprises a slate angle calculation means to determine an angle of a clap slate in the frames of the video mode.

11. The system of claim 7, wherein the estimating means comprises:
   an angular speed calculating means configured to determine an angular speed of the clap slate; and
   a closing prediction means configured to predict when the clap slate is closed.

12. The system of claim 7, wherein the synchronizing means comprises summing means configured to augment the associated location of the audio mode by an amount equal to a difference between the occurrence of the nearest frame and the estimated location for the occurrence of the closing of a clap slate in the video mode to provide sub-frame synchronization between the audio and video modes.

13. The system of claim 7, wherein the means for determining the location of the closing of a clap slate in an audio mode comprises an audio recognition means.

14. The system of claim 7, wherein the synchronizing means synchronizes the audio mode to the video mode by adjusting the associated location of the audio mode by an amount equal to a difference between the occurrence of the nearest frame and the estimated location for the occurrence of the closing of a clap slate in the video mode.

15. The system of claim 7, wherein the synchronizing means synchronizes the audio mode to the video mode by adding a correction time to time of occurrence of the closing of a clap slate in the audio mode to designate a starting point and aligning the starting point to a nearest frame after the occurrence of the closing of a clap slate in the video mode.

* * * * *